United States Patent [19]
Phelps

[11] Patent Number: 5,564,215
[45] Date of Patent: Oct. 15, 1996

[54] ADJUSTABLE FISH HOOK BAIL

[76] Inventor: Don R. Phelps, 1514 Roosevelt, Joplin, Mo. 64801

[21] Appl. No.: 489,145

[22] Filed: Jun. 9, 1995

[51] Int. Cl.⁶ ............................ A01K 87/00; A01K 87/06
[52] U.S. Cl. ............................................. 43/25.2; 43/22
[58] Field of Search ............................... 43/25.2, 57.3, 43/22, 23

[56] References Cited

U.S. PATENT DOCUMENTS

| | | | |
|---|---|---|---|
| 911,117 | 2/1909 | Crosier | 43/25.2 |
| 3,281,981 | 11/1966 | Dykhouse | 43/25.2 |
| 3,411,232 | 11/1968 | Rumbaugh | 43/25.2 |
| 3,425,150 | 2/1969 | Braese | 43/25.2 |
| 3,815,273 | 6/1974 | Perkins | 43/25.2 |
| 3,988,850 | 11/1976 | Steinman | 43/25.2 |
| 4,015,361 | 4/1977 | O'Reilly et al. | 43/25.2 |
| 4,467,548 | 8/1984 | Tabor | 43/23 |
| 4,667,433 | 5/1987 | Thompson, Jr. | 43/25.2 |
| 5,160,257 | 11/1992 | Tsengas | 43/25 |
| 5,214,874 | 6/1993 | Faulkner | 43/25.2 |

*Primary Examiner*—Joseph J. Hail, III
*Assistant Examiner*—Darren Ark
*Attorney, Agent, or Firm*—Richard L. Miller, P.E.

[57] ABSTRACT

An adjustable fish hook bail that includes a hollow substantially ring-shaped main portion that has a main portion outer surface, and a hollow substantially kidney-shaped peripheral portion formed integrally with the hollow substantially ring-shaped main portion that has a peripheral portion outer surface. The main portion outer surface is in connect with the peripheral outer surface so that the hollow substantially ring-shaped main portion and the hollow substantially kidney-shaped peripheral portion form a substantially FIG. "8" configuration.

19 Claims, 1 Drawing Sheet

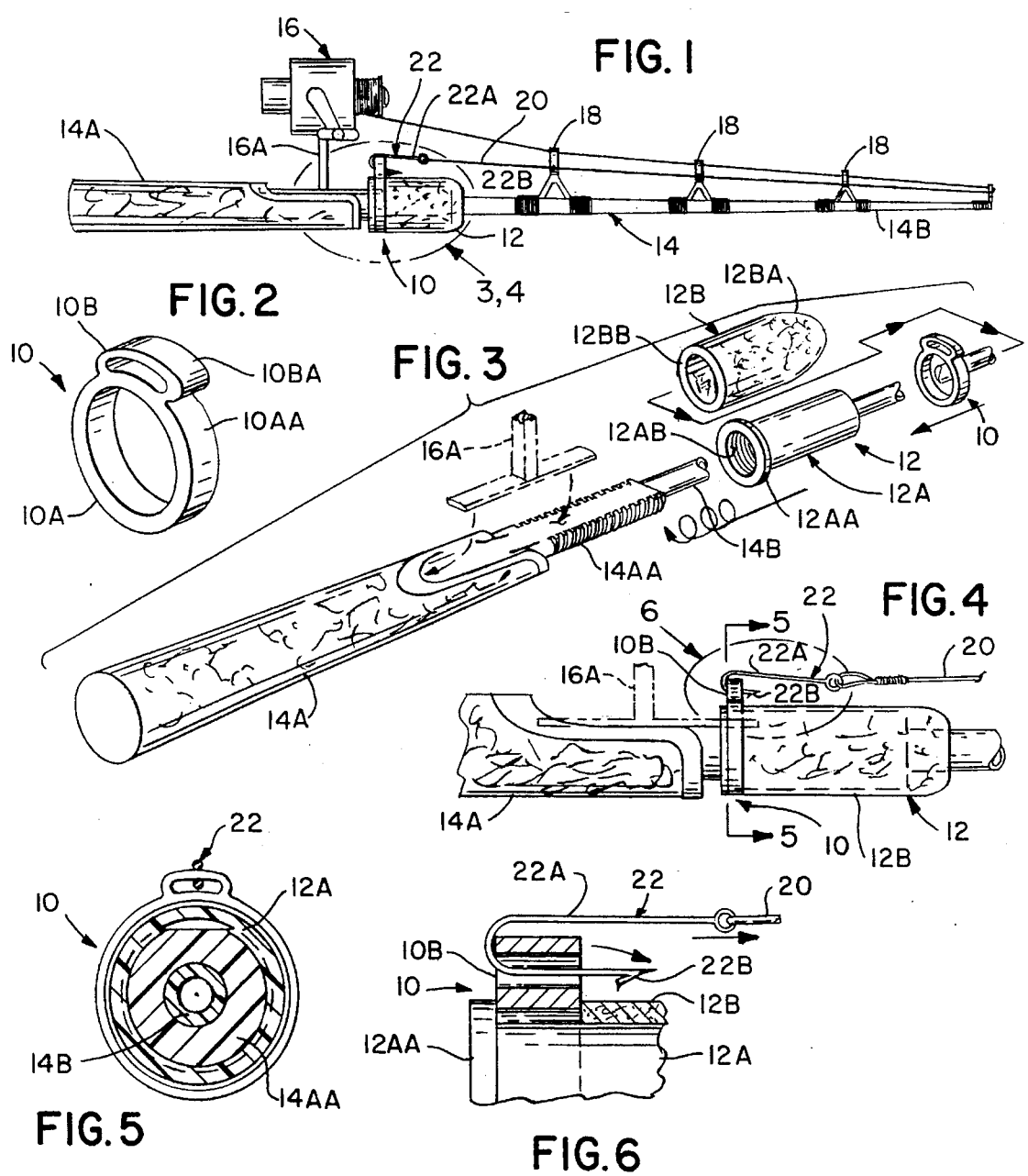

ADJUSTABLE FISH HOOK BAIL

BACKGROUND OF THE INVENTION

The present invention relates to an adjustable fish hook bail. More particularly, the present invention relates to an adjustable fish hook bail that is an inexpensive stamping wherein the fishing pole is inserted therethrough and can further be rotatively oriented in a desirable position at the time the reel is secured to the fishing pole.

When a fishing rig is not in use and during certain times of use, as when the hook is being or is about to have bait engaged thereon, the free end portion of the line with the hook at the end thereof is left to swing about. This creates a hazard and unreasonable risk of harm to the fisherman and others in the immediate area.

Numerous innovations for fish hook bails have been provided in the prior art that will be described. However, even though these innovations may be suitable for the specific individual purposes to which they address, they differ from the present invention in that they do not teach an adjustable fish hook bail that is an inexpensive stamping wherein the fishing pole is inserted therethrough and can further be rotatively oriented in a desirable position at the time the reel is secured to the fishing pole.

For example, U.S. Pat. No. 3,815,273 to Perkins teaches a fish hook holder that includes a magnet with a flat pole surface disposed radially outward from the rod and adapted to orient and hold the hook in substantially flat engagement on the pole surface. A plurality of spaced hook engagement posts are disposed adjacent to and projecting outward from the pole surface.

Another example, U.S. Pat. No. 4,015,361 to O'Reilly et al. teaches a fish hook retainer in the shape of a fish and formed by two retainer halves by a structurally integral hinge. One of the retainer halves is provided with structure for attaching the retainer to the fishing pole.

Finally, another example, U.S. Pat. No. 5,214,874 to Faulkner teaches a holder for temporarily fastening an article to a fishing rod. The holder includes a plurality of strap-like pliable members which are fastened together by one or more elastic elements. The members are adapted to be wrapped around the foregrip of a fishing rod and held in place by a plurality of hooks and loops. A second strap-like member or talon and elastic element are adapted to releasibly hold the article in place.

It is apparent that numerous innovations for fish hook bails have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, it is an object of the present invention to provide an adjustable fish hook bail that avoids the disadvantages of the prior art.

It is another object of the present invention to provide an adjustable fish hook bail that is simple and inexpensive to manufacture.

Still another object of the present invention to provide an adjustable fish hook bail that is simple to use.

Yet another object of the present invention is to provide an adjustable fish hook bail that includes a foregrip internal tubular member, a fish hook bail rotatively mounted around the foregrip internal tubular member so that desired orientation of the fish hook bail relative to the foregrip internal member can be readily achieved, and a foregrip external member disposed around the foregrip internal tubular member and sandwiches the fish hook bail therebetween so that the fish hook bail is rotatively secured.

Still yet another object of the present invention is to provide an adjustable fishing hook bail wherein the fish hook bail includes a hollow substantially ring-shaped main portion that has a main portion outer surface and an open substantially kidney-shaped peripheral portion that has a peripheral portion outer surface.

Yet still another object of the present invention is to provide an adjustable fish hook bail wherein the main portion outer surface is in connect with the peripheral outer surface so that the hollow substantially ring-shaped main portion and the open substantially kidney-shaped peripheral portion form a substantially FIG. "8" configuration.

Still yet another object of the present invention is to provide an adjustable fish hook bail wherein the hollow substantially ring-shaped main portion and the open substantially kidney-shaped peripheral portion are integrally formed.

Yet still another object of the present invention is to provide an adjustable fish hook bail wherein the hollow substantially ring-shaped main portion and the open substantially kidney-shaped peripheral portion are manufactured from a material selected from a group consisting of aluminum and plastic.

Still yet another object of the present invention is to provide an adjustable fish hook bail wherein the hollow substantially ring-shaped main portion and the open substantially kidney-shaped peripheral portion are manufactured by a process selected from a group consisting of stamping and extrusion.

Yet still another object of the present invention is to provide an adjustable fish hook bail wherein the foregrip internal tubular member has a foregrip internal tubular member rear lip on which the fish hook bail abuts.

Still yet another object of the present invention is to provide an adjustable fish hook bail wherein the foregrip internal tubular member is resilient.

Yet still another object of the present invention is to provide an adjustable fish hook bail wherein the foregrip external tubular member has a foregrip external tubular member front that is rounded.

Still yet another object of the present invention is to provide an adjustable fish hook bail wherein the foregrip external tubular member is cork.

Finally, another object of the present invention is to provide an adjustable fish hook bail wherein the foregrip external tubular member has a foregrip external tubular member rear that abuts against said fish hook bail.

The novel features which are considered characteristic of the present invention are set forth in the appended claims. The invention itself, however, both as to its construction and its method of operation, together with additional and advantages thereof, will be best understood from the following description of the preferred embodiment when read and understood in conjunction with the accompanying drawing.

BRIEF DESCRIPTION OF THE DRAWING

FIG. 1 is a diagrammatic side elevational view illustrating a fishing rod with the instant invention installed thereon;

FIG. 2 is a diagrammatic perspective view of the instant invention before it is installed on a fishing rod;

FIG. 3 is a diagrammatic exploded perspective view taken in the area of the dotted curve indicated by arrow 3 in FIG. 1 showing how the instant invention is installed on a fishing rod;

FIG. 4 is an enlarged diagrammatic partial view taken in the area of the dotted curve indicated by arrow 4 in FIG. 1;

FIG. 5 is a cross sectional view taken on line 5—5 of FIG. 4; and

FIG. 6 is an enlarged diagrammatic cross sectional view with parts broken away taken in the area of the dotted curve indicated by arrow 6 in FIG. 4.

LIST OF REFERENCE NUMERALS UTILIZED IN THE DRAWING

10—adjustable fish hook bail
10A—adjustable fish hook bail main portion
10AA—adjustable fish hook bail main portion outer surface
10B—adjustable fish hook bail peripheral portion
10BA—adjustable fish hook bail peripheral portion outer surface
12—fishing rod foregrip
12A—fishing rod foregrip internal member
12AA—fishing rod foregrip internal member rear lip
12AB—fishing rod foregrip internal member plurality of internal threads
12B—fishing rod foregrip external member
12BA—fishing rod foregrip external member rounded front
12BB—fishing rod foregrip external member rear
14—fishing rod
14A—fishing rod handle
14AA—fishing rod handle plurality of external threads
14B—fishing rod pole portion
16—fishing reel
16A—fishing reel mount
18—fishing rod pole portion eyelets
20—fishing line
22—fishing hook
22A—fish hook shank portion
22B—hook barb portion

DETAILED DESCRIPTION OF THE PREFERRED EMBODIMENT

Referring now to the figures in which like numerals indicate like parts, and particularly to FIG. 1, the adjustable fish hook bail of the present invention is shown generally at 10 adjustably secured within the foregrip 12 of a fishing rod 14. The fishing rod 14 includes a fishing rod handle 14A with a plurality of fishing rod handle threads 14AA, and a fishing rod pole portion 14B. Attached to the fishing rod 14 is a fishing reel 16 with a fishing reel mount 16A, a plurality of fishing pole portion eyelets 18, and a fishing line 20 which originates at the fishing reel 16, passes through the plurality of fishing pole portion eyelets 18, and terminates at a hook 22. The hook is removably secured to the adjustable fish hook bail 10 and includes a fish hook shank portion 22A and a hook barb portion 22B.

The configuration of the adjustable fish hook bail 10 can best be seen in FIG. 2, and as such, will be discussed with reference thereto. It is to be noted that the adjustable fish hook bail 10 can be a one-piece stamping or an extrusion, but is not limited to that, and further can be metallic such as aluminum, or ceramic such as plastic, but again is not limited to that.

The adjustable fish hook bail 10 includes an adjustable fish hook bail main portion 10A and an adjustable fish hook bail peripheral portion 10B that projects outwardly from the adjustable fish hook bail main portion 10A. The adjustable fish hook bail main portion 10A is circular and hollow and is substantially ring-shaped and has an adjustable fish hook bail main portion outer surface 10AA. The adjustable fish hook bail peripheral portion 10B is open and is substantially kidney-shaped and has an adjustable fish hook bail peripheral portion outer surface 10BA. Simply, the adjustable fish hook bail peripheral portion 10B is of a substantially ring-shaped configuration that is compressed in the radial direction. The adjustable fish hook bail 10 is configured with the adjustable fish hook bail main portion outer surface 10AA being in contact with the adjustable fish hook bail peripheral portion outer surface 10BA.

The method for securing the adjustable fish hook bail 10 to the fishing rod 14 can best be seen in FIGS. 3, 4, and 5, while its use can best be seen in FIGS. 1, 4 and 6, and as such, will be discussed with reference thereto. The foregrip 12 includes a foregrip internal tubular member 12A and a foregrip external tubular member 12B. The foregrip internal tubular member 12A has a foregrip internal tubular member rear lip 12AA and a foregrip internal tubular member plurality of internal threads 12AB. The foregrip internal tubular member 12A is resilient rubber, but is not limited to that. The foregrip external tubular member 12B is cork, but is not limited to that, has a foregrip external tubular member rear 12BB, and has a substantially rounded foregrip external member front 12BA so that the user can safely grip the fishing rod 14 without injury to the hand.

In operation, the fishing reel mount 16A is placed on the flat portion of the fishing rod handle 14A in the area of the fishing rod handle plurality of threads 14AA. The mount 16A is held in place by one hand of the user while the foregrip internal tubular member 12A, with the foregrip internal tubular member rear lip 12AA facing towards the fishing reel 16, is threaded onto the plurality of fishing rod handle threads 14AA with the fishing reel mount 16A being sandwiched therebetween.

Next, the adjustable fish hook bail main portion 10A is slid onto the foregrip internal tubular portion 12A until the fish hook bail main portion 10A abuts against the foregrip internal tubular portion lip 12AA. Since the fish hook bail 10 is slid onto the internal tubular member 12A, and is not fixedly attached thereto, the adjustable fish hook bail 10 can be revolved around the foregrip internal tubular member 12A to any position desired by the user.

The foregrip external tubular. member 12B is then slid also onto the foregrip internal tubular member 12A until the foregrip external member rear 12BB abuts against the adjustable fish hook bail main portion 10A. This action sandwiches the adjustable fish hook bail 10 between the foregrip internal tubular member 12A and the foregrip external tubular member 12B while allowing the adjustable fish hook bail 10 to be rotated, if necessary, to further fine tune the adjustment of its position.

The fishing hook 22 is so positioned so that the fishing hook shank 22A rests outside the peripheral portion 10B while the barb portion 22B passes through and rests within the main portion 10A. It will be understood that each of the elements described above, or two or more together, may also find a useful application in other types of constructions differing from the types described above.

While the invention has been illustrated and described as embodied in an adjustable fish hook bail, it is not intended to be limited to the details shown, since it will be understood that various omissions, substitutions and changes in the forms and details of the device illustrated and in its operation can be made by those skilled in the art without departing in any way from the spirit of the present invention.

Without further analysis, the foregoing will so fully reveal the gist of the invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims.

The invention claimed is:

1. A fish hook bail, comprising:
   a) a hollow substantially ring-shaped main portion having a circular-shaped perimeter; and
   b) an open and substantially kidney-shaped peripheral portion having a convexo-concave-shaped perimeter with a convex part and a concave part; said circular-shaped perimeter of said hollow substantially ring-shaped main portion coinciding with said concave part of said convexo-concave-shaped perimeter of said open and substantially kidney-shaped peripheral portion, so that said hollow substantially ring-shaped main portion and said open and substantially kidney-shaped peripheral portion form a substantially FIG. "8" configuration.

2. The bail as defined in claim 1, wherein said hollow substantially ring-shaped main portion and said open and substantially kidney-shaped peripheral portion are integrally formed.

3. The bail as defined in claim 2, wherein said hollow substantially ring-shaped main portion and said open and substantially kidney-shaped peripheral portion are manufactured from a material selected from the group consisting of aluminum and plastic.

4. The bail as defined in claim 2, wherein said hollow substantially ring-shaped main portion and said open and substantially kidney-shaped peripheral portion are manufactured by a process selected from the group consisting of stamping and extrusion.

5. A fish hook bail arrangement, comprising:
   a) a hollow and cylindrically shaped internal foregrip member being coaxially-disposed with and encircling a portion of a fishing rod;
   b) a fish hook bail including a hollow substantially ring-shaped main portion that has a circular-shaped perimeter and an open and substantially kidney shaped peripheral portion that has a convexo-concave-shaped perimeter with a convex part and a concave part, said bail being rotatively-coaxially-disposed with and encircling a portion of said hollow and cylindrically shaped internal foregrip member, so that desired orientation of said fish hook bail relative to said hollow and cylindrically shaped internal foregrip member can be readily achieved; and
   c) a hollow and cylindrically shaped external foregrip member being coaxially-disposed with and encircling said hollow and cylindrically shaped internal foregrip member and sandwiching said fish hook bail therebetween; both said hollow and cylindrically shaped internal foregrip member and said hollow and cylindrically shaped external foregrip member bearing on said fish hook bail, so that said fish hook bail is rotatively secured therebetween.

6. The arrangement as defined in claim 5, wherein said circular-shaped perimeter of said hollow substantially ring-shaped main portion coincides with said concave part of said convexo-concave-shaped perimeter of said open and substantially kidney-shaped peripheral portion, so that said hollow substantially ring-shaped main portion and said open and substantially kidney-shaped peripheral portion form a substantially FIG. "8" configuration.

7. The arrangement as defined in claim 6, wherein said hollow substantially ring-shaped main portion and said open and substantially kidney-shaped peripheral portion are integrally formed.

8. The arrangement as defined in claim 7, wherein said hollow substantially ring-shaped main portion and said open and substantially kidney-shaped peripheral portion are manufactured from a material selected from the group consisting of aluminum and plastic.

9. The arrangement as defined in claim 7, wherein said hollow substantially ring-shaped main portion and said open and substantially kidney-shaped peripheral portion are manufactured by a process selected from the group consisting of stamping and extrusion.

10. The arrangement as defined in claim 5, wherein said hollow and cylindrically-shaped internal foregrip member has a rear edge with a circumferentially-disposed and radially-outwardly extending lip that encircles said rear edge of said hollow and cylindrically-shaped internal foregrip member and extends radially-outwardly therefrom and on which said fish hook bail abuts.

11. The arrangement as defined in claim 10, wherein said hollow and cylindrically-shaped internal foregrip member is resilient.

12. The arrangement as defined in claim 5, wherein said hollow and cylindrically-shaped external foregrip member has a front edge that is rounded.

13. The arrangement as defined in claim 12, wherein said hollow and cylindrically-shaped external foregrip member is cork.

14. The arrangement as defined in claim 5, wherein said hollow and cylindrically-shaped external foregrip member has a rear edge that abuts against said fish hook bail.

15. A method for adjustably mounting a fish hook bail to a fishing rod, comprising the steps of:
   a) positioning a fishing reel on a fishing rod;
   b) threading a hollow and cylindrically-shaped internal foregrip member coaxially onto and encircling a part of the fishing rod and over a part of the fishing reel with both said hollow and cylindrically-shaped internal foregrip member and the part of the fishing rod bearing on the part of the fishing reel;
   c) sliding a fish hook bail onto and encircling said hollow and cylindrically-shaped internal foregrip member, so that desired orientation of said fish hook bail relative to said hollow and cylindrically-shaped internal foregrip member can be readily achieved; and
   d) positioning a hollow and cylindrically-shaped external foregrip member coaxially onto and encircling said hollow and cylindrically-shaped internal foregrip member and sandwiching said fish hook bail therebetween with both said hollow and cylindrically shaped internal foregrip member and said hollow and cylindrically shaped external foregrip member bearing on said fish hook bail, so that said fish hook bail is rotatively secured therebetween.

16. The method as defined in claim 15, wherein said fish hook bail includes a hollow substantially ring-shaped main portion that has a circular-shaped perimeter and an open and substantially kidney-shaped peripheral portion that has a convexo-concave-shaped perimeter with a convex part and a concave part.

17. The method as defined in claim 16, wherein said circular-shaped perimeter of said hollow substantially ring-shaped main portion coincides with said concave part of said convexo-concave-shaped perimeter of said open and substantially kidney, shaped peripheral portion, so that said hollow substantially ring-shaped main portion and said open and substantially kidney-shaped peripheral portion form a substantially FIG. "8" configuration.

18. The method as defined in claim 17, wherein said hollow substantially ring-shaped main portion and said open and substantially kidney-shaped peripheral portion are integrally formed.

19. The method as defined in claim 18, wherein said hollow and cylindrically-shaped internal foregrip member has a rear edge with a circumferentially-shaped and radially-outwardly extending lip that encircles said rear edge of said hollow and cylindrically-shaped internal foregrip member and extends radially-outwardly therefrom and on which said fish hook bail abuts.

\* \* \* \* \*